(12) United States Patent
Gagosz

(10) Patent No.: US 7,281,399 B2
(45) Date of Patent: Oct. 16, 2007

(54) CABLE ANTI-THEFT DEVICE FOR A CYCLE AND CYCLE EQUIPPED WITH SUCH A DEVICE

(75) Inventor: Jean-Claude Gagosz, Bu (FR)

(73) Assignee: JCDecaux SA, Neuilly Sur Seine (FR)

( * ) Notice: Subject to any disclaimer, the term of this patent is extended or adjusted under 35 U.S.C. 154(b) by 0 days.

(21) Appl. No.: 11/267,438

(22) Filed: Nov. 4, 2005

(65) Prior Publication Data

US 2006/0096341 A1 May 11, 2006

(30) Foreign Application Priority Data

Nov. 9, 2004 (FR) .................................. 04 11927

(51) Int. Cl.
E05B 71/00 (2006.01)
(52) U.S. Cl. ............................. 70/233; 70/49; 70/185; 211/5; 224/424; 224/935
(58) Field of Classification Search .................... 70/18, 70/30, 49, 62, 182–186, 225–228, 233–236; 211/5, 4, 17, 19, 20, 23, 24; 280/288.4, 281.1; 224/424, 935; 248/551–553
See application file for complete search history.

(56) References Cited

U.S. PATENT DOCUMENTS

| 583,893 | A | * | 6/1897 | Davidson | 70/226 |
|---|---|---|---|---|---|
| 2,140,489 | A | * | 12/1938 | Solomon | 70/227 |
| 2,180,117 | A | * | 11/1939 | Lipsis | 70/236 |
| 3,950,972 | A | * | 4/1976 | Bleier et al. | 70/234 |
| 4,012,930 | A | * | 3/1977 | Benson | 70/234 |
| 4,028,916 | A | * | 6/1977 | Pender | 70/233 |
| 4,033,160 | A | * | 7/1977 | Mima | 70/233 |
| 4,055,060 | A | * | 10/1977 | Bellino | 70/234 |
| 4,086,795 | A | * | 5/1978 | Foster et al. | 70/233 |
| 4,099,394 | A | * | 7/1978 | Joo | 70/233 |
| 4,404,822 | A | * | 9/1983 | Green | 70/233 |
| 4,490,997 | A | * | 1/1985 | Hughes et al. | 70/233 |
| 4,776,188 | A |   | 10/1988 | Dalaba et al. |  |
| 4,811,577 | A | * | 3/1989 | Webster et al. | 70/14 |
| 4,945,739 | A | * | 8/1990 | Prindle | 70/233 |
| 5,598,727 | A | * | 2/1997 | White | 70/233 |

FOREIGN PATENT DOCUMENTS

| DE | 296 24 281 U1 | 8/2001 |
|---|---|---|
| FR | 2 837 781 A1 | 10/2003 |

OTHER PUBLICATIONS

Search Report and Annex recieved in French Application No. FR 0411927, dated Jun. 27, 2005.

* cited by examiner

Primary Examiner—Lloyd A. Gall
(74) Attorney, Agent, or Firm—Marshall Gerstein & Borun LLP

(57) ABSTRACT

A cycle provided with a frame and an anti-theft device comprising a cable having a first end permanently fixed to the frame and a mobile second end capable of cooperating with a bolt mounted on the frame, this bolt being movable between a locking position in which it locks the second end of the cable with respect to the frame, and an unlocking position in which it releases this second end with respect to the frame.

18 Claims, 5 Drawing Sheets

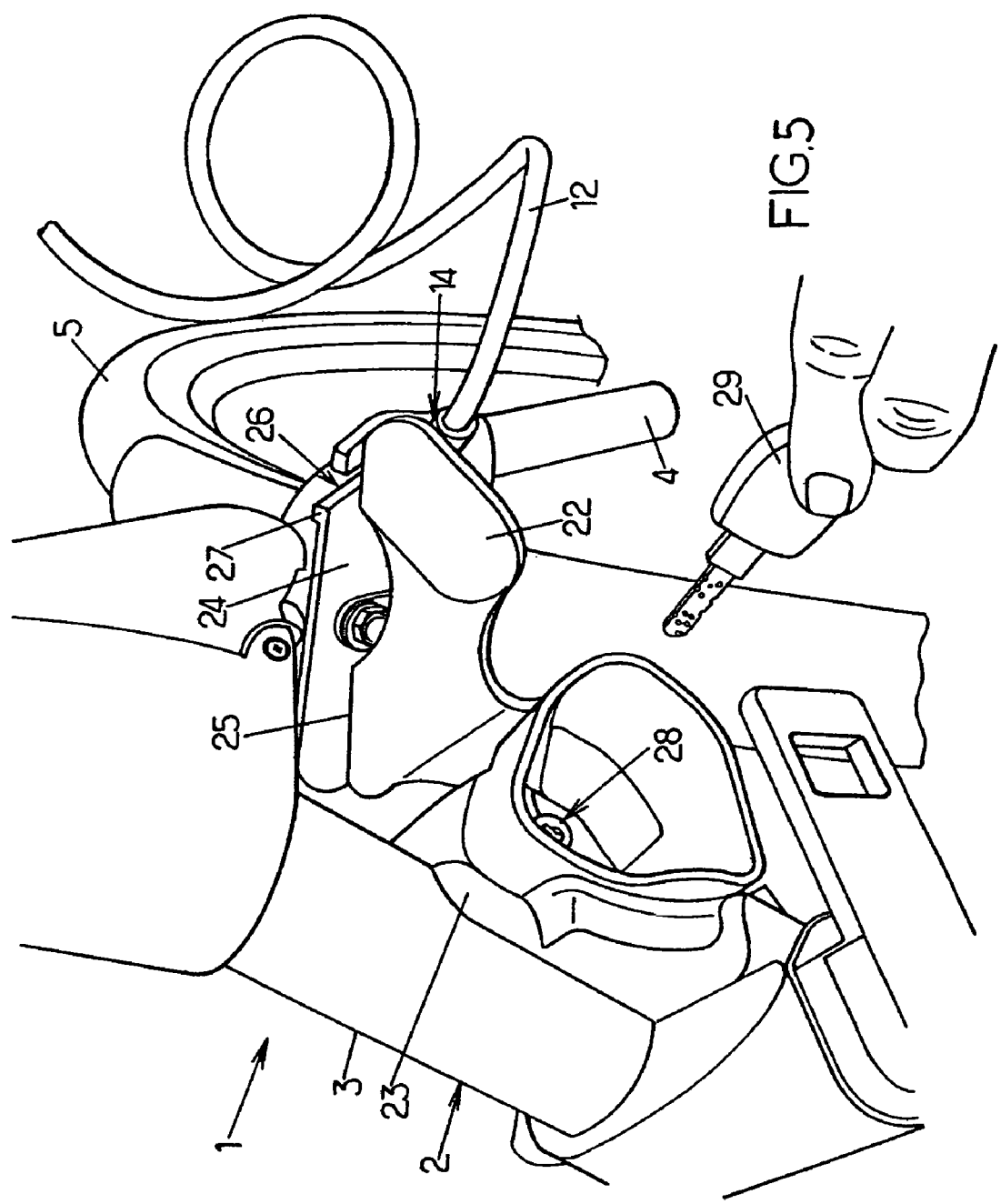

CABLE ANTI-THEFT DEVICE FOR A CYCLE AND CYCLE EQUIPPED WITH SUCH A DEVICE

FIELD OF THE INVENTION

The invention relates to cycles, and more particularly to anti-theft devices for cycles.

BACKGROUND OF THE INVENTION

Numerous anti-theft devices intended for cycles (and in particular for bicycles) are known. By way of example, reference can be made to the cable anti-theft device by means of which a closed loop is formed, which attaches either the cycle as a whole to an item of urban furniture (such as a post or a tree) or one of the wheels of the cycle to its frame in order to prevent its free rotation. Reference can also be made to U-shaped locks, which comprise a male part in the form of a curved rigid rod which is passed through the spokes of one of the cycle's wheels and a female part which is snapped onto the end of the male part in order to prevent its withdrawal from the wheel.

The effectiveness of these devices is not contested. They do however have, as a principal disadvantage, the fact that they are bulky and can be tricky to use. In particular, considering the various positions that a cycle can assume, and the configuration of the urban furniture to which it must be attached, it is sometimes difficult to connect the two ends of a cable anti-theft device, or to snap on the female part of a U-shaped lock to the male part.

SUMMARY OF THE INVENTION

The invention particularly intends to remedy these disadvantages by proposing an anti-theft device having increased ease of use.

For this purpose, the invention proposes an anti-theft device for a cycle provided with a frame, this device comprising a cable having a first end permanently fixed to the frame of the cycle, and a mobile second end capable of cooperating with a bolt mounted on the frame, this bolt being movable between a locking position in which it locks the second end of the cable with respect to the frame, and an unlocking position in which it releases this second end.

In this way, it is not necessary for the user to provide himself with a separate anti-theft device, the latter being integrated with the cycle. This results in an increased ease of use. In particular, it is not necessary to make the ends of the cable cooperate, which reduces the time for positioning the anti-theft device.

BRIEF DESCRIPTION OF THE DRAWINGS

Other objects and advantages of the invention will become apparent in the light of the description given below with reference to the appended drawings in which:

FIGS. 2 to 5 are partial perspective views showing the bicycle of FIG. 1, viewed from another angle and illustrating the method of positioning the anti-theft device.

DESCRIPTION OF A PREFERRED EMBODIMENT

Figure 1:
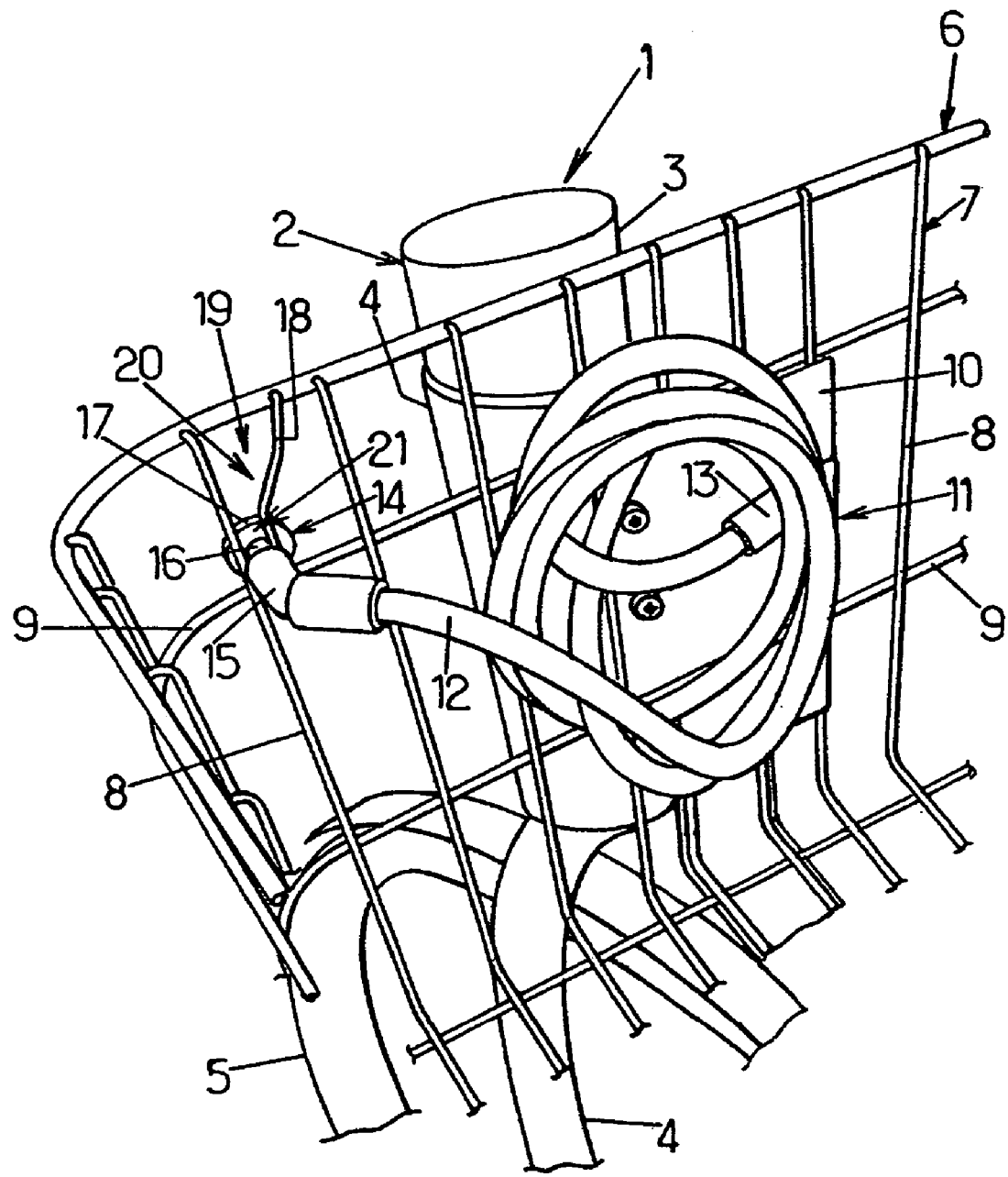
FIG. 1 is a partial perspective view of a bicycle equipped with an anti-theft device according to the invention.

FIG. 1 shows a bicycle 1 comprising a frame 2 composed of a framework 3 made from welded or brazed tubes. The frame 2 in particular comprises a fork 4 carrying a rotating front wheel 5 of the bicycle 1, this fork 4 being mounted such that it pivots on the framework 3, as shown in all of the figures.

As can be seen in FIG. 1, the frame 2 furthermore comprises a luggage holder 6 permanently fixed on the fork 4. This luggage holder is in the form of a basket made from a lattice 7 of vertical 8 and horizontal 9 steel wires; it is fixed to the fork 4 by means of an attached metal plate 10 which, straddling several wires 8, 9 of the lattice 7, is screwed into the fork 4.

The bicycle 1 is equipped with an integrated anti-theft device 11 which comprises a cable 12 having a first end 13 permanently fixed on the frame 2, and a mobile second end 14 shaped as a hook.

More precisely, the fixed end 13 of the cable 12 is permanently fixed to the luggage holder 6, for example by being welded or screwed to the plate 10 for fixing the latter to the fork 4, as shown in FIG. 1.

With regard to the mobile end 14 of the cable 12, this comprises, in order to form a hook, a cylindrical shaft 15 extended by a rod 16 having a diameter less than that of the shaft 15, this rod 16 being in its turn extended by a disk 17 of diameter greater than that of the rod 16.

The luggage holder 6 is provided with an additional bent wire 18 defining, with one of the vertical wires 8 of the lattice 7, a housing 19 that is substantially complementary to the hook 14 and into which the latter is inserted when the cable 12 is not being used, as shown in FIG. 1.

This housing 19 has an upper part 20, where the separation between the additional wire 18 and the wire 8 of the lattice 7 is sufficient to allow the insertion and the withdrawal of the hook 14, and a lower part 21 where the separation between the additional wire 18 and the wire 8 of the lattice 7 is less than the diameter of the shaft 15 and than that of the disk 17, such that the hook 14, resting on a horizontal wire 9, is held there, unless it is raised in order to place it in alignment with the upper part 20, which allows its withdrawal.

The anti-theft device 11 furthermore comprises a bolt 22, mounted on the frame 2 and with which the mobile end 14 of the cable is capable of cooperating, this bolt 22 being mobile between:

a locking position in which it locks the second end 14 of the cable 12 with respect to the frame 2, and an unlocking position in which it releases this second end 14 with respect to the frame 2.

More precisely, this bolt 22 is in the form of a pivoting lever, mounted such that it is hinged on a support 23 fixed on the framework 3 in the vicinity of the fork 4.

Figure 2:
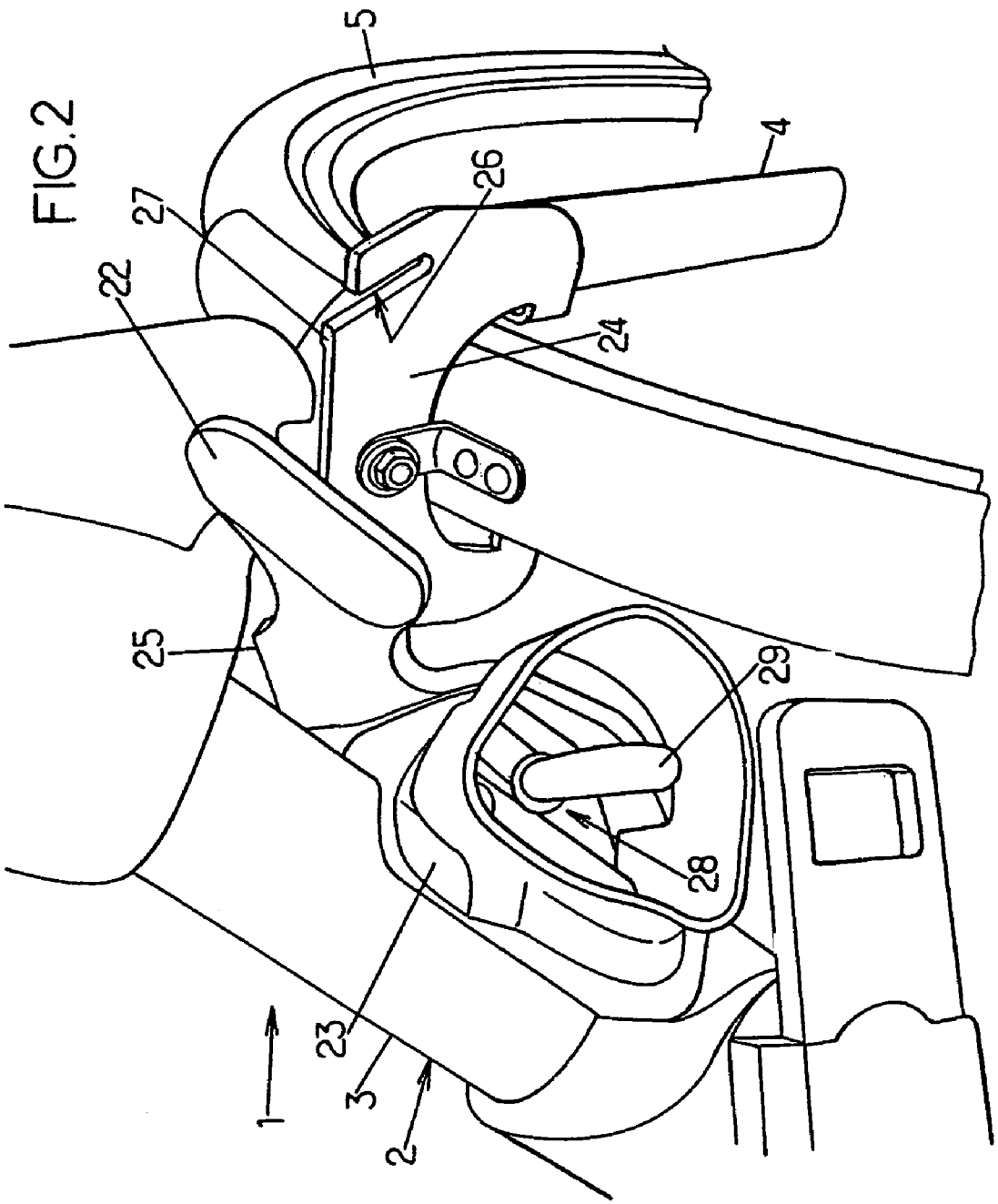

A plate 24 is fitted to the fork 4, this plate 24 being in the from of a metal plate disposed in the plane of the fork 4, that is to say in a plane containing the axis of the front wheel 5 and the tubes which, forming the fork 4, are disposed on either side of the wheel 5 (FIG. 2).

In its unlocking position, the bolt 22 occupies a high position in which it is held against the framework 3, and allows the free rotation of the fork 4 with respect to the latter.

In its locking position, it occupies, on the contrary, a low position in which one of its edges, called the front edge 25, is against the plate 24, after the wheel 5 has been turned though a non-zero angle with respect to the framework 3.

Figure 3:
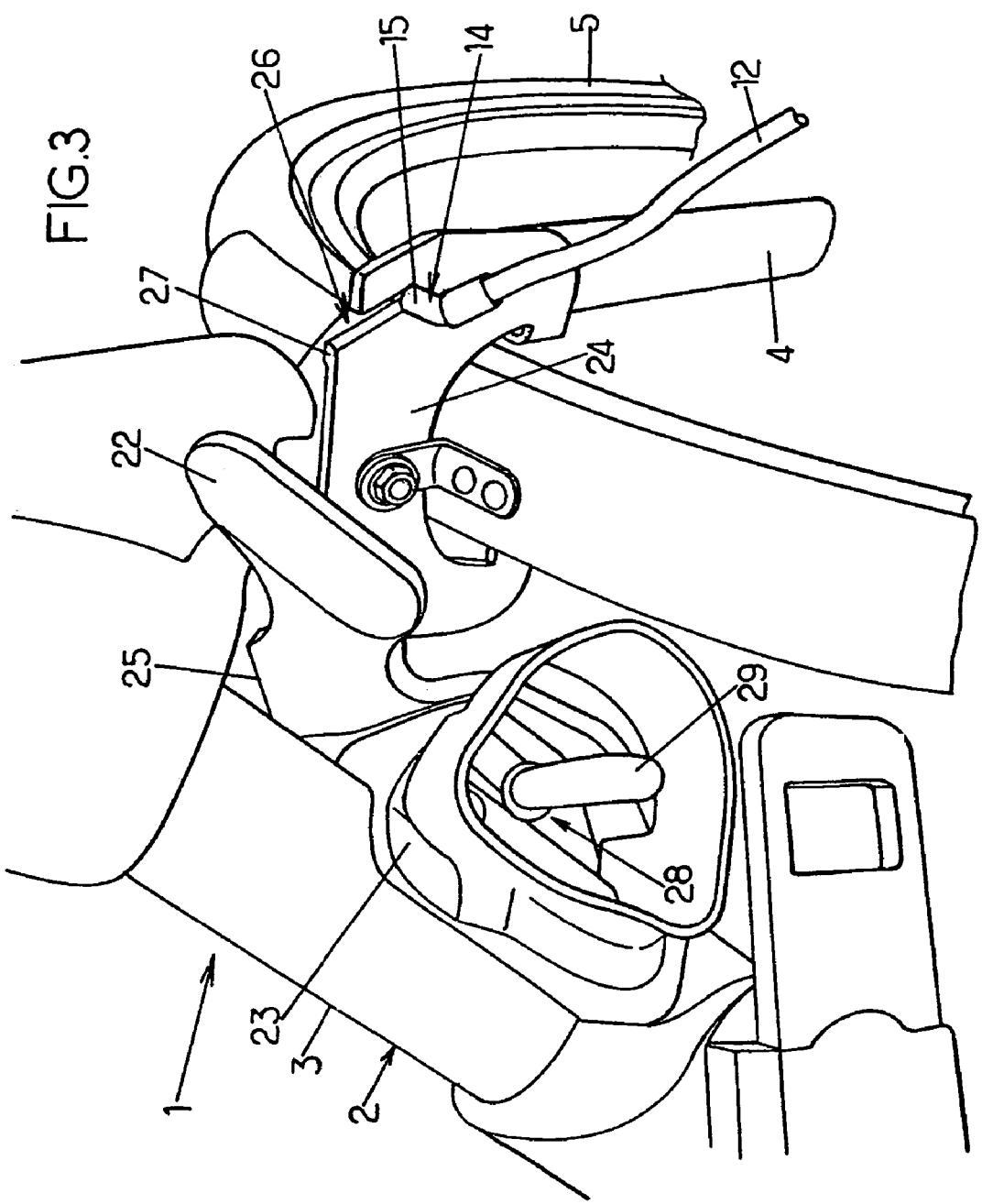
Figure 4:
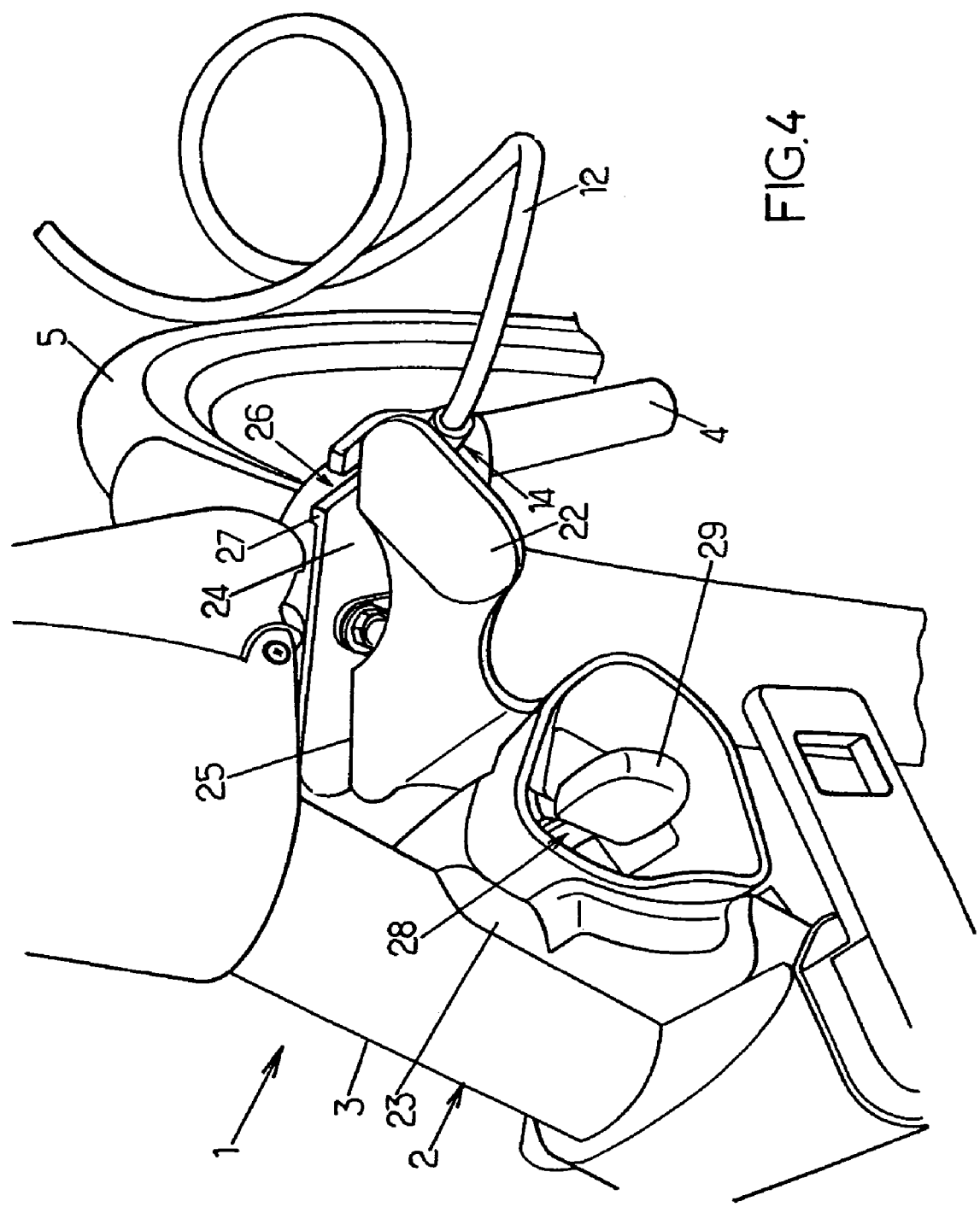

As can be seen in FIGS. 2 and 3 in particular, the plate 24 comprises a slot 26 emerging on an upper edge 27 of the plate 24, this slot 26 having a width slightly greater than the diameter of the rod 16 of the hook 14, the plate 24 furthermore having a thickness slightly less that the length of this rod 16.

Consequently, it is possible to insert the hook 14 in the slot 26, as shown in FIG. 3, the hook 14, held on either side of the plate 24 by the shaft 15 on the one hand and by the disk 17 on the other hand, being able to be withdrawn from the slot 26 only by being slid along the latter.

Starting from a configuration in which the bolt 22 is in its unlocking position, and in which the front wheel 5 is turned through a non-zero angle with respect to the framework 3, this angle being sufficient to allow the free pivoting of the bolt 22 without the latter butting against the plate 24 (FIG. 2), the positioning of the anti-theft device is carried out as follows. In this configuration, the bolt 22 is at a distance from the plate 24 (and therefore from the slot).

After the cable 12 has been used in the conventional manner (for example by going around an item of urban furniture such as a post), the operation starts by inserting the hook 14 in the slot 26 (FIG. 3).

Then, the bolt 22 is lowered towards the locking position. In this position, the bolt 22 is adjacent to the slot 26, its front edge 25 being substantially perpendicular to the latter. The hook 14 is now locked with respect to the plate 24, unless the bolt 22 is raised to the unlocking position again in order to allow the withdrawal of the hook 14.

As shown in FIGS. 2 to 5, the support 23 is equipped with a key 29-operated lock 28 which can assume, when the key 29 is operated:

a closed position (shown in FIG. 4) in which the bolt 22 is held in its locking position, and an open position (FIG. 3) allowing the passage of the bolt 22 from its locking position to its unlocking position, and vice versa.

Thus, the withdrawal of the key 29 from the lock 28 (as shown in FIG. 5) locks the bolt 22 in its locking position and thus holds the hook 14 on the plate 24. The bicycle 1 is thus attached to the piece of urban furniture chosen by the user who alone is able to detach it by operating the key 29 in the lock 28.

It is thus possible to position the anti-theft device simply by a simple maneuver of the free end 14 of the cable 12. As this cable is fixed, by its opposite end 13, to the frame 2 (in this instance to the luggage holder 6), it is not necessary for a separate anti-theft device to be provided.

Such an anti-theft device 11 is particularly suitable for hired bicycles because their users only rarely thinking of bringing an anti-theft device with them.

The arrangements which ensure, on the one hand, the locking of the cable 12 and, on the other hand, the locking of the front wheel 5 in a position that is turned with respect to the framework 3 are complementary: cutting the cable 12 with a cutting device does not release the bicycle 1 totally, its front wheel 5 being in a position preventing movement in a straight line.

It follows that, even though particularly suitable for bicycles, the anti-theft device that has just been described can be fitted to all types of cycles, such as motorcycles, scooters and light motorcycles.

The invention claimed is:

1. Cycle provided with a frame and an anti-theft device comprising a cable having a first end permanently fixed to the frame and a mobile second end capable of cooperating with a bolt mounted on the frame, the bolt being movable between a locking position in which the bolt locks the second end of the cable with respect to the frame, and an unlocking position in which the bolt releases the second end with respect to the frame, and wherein the frame of the cycle comprises a framework upon which a fork carrying a front wheel is mounted in a pivoting manner, the anti-theft device further comprising a plate being mounted on the fork, the bolt locking the second end of the cable with respect to the plate.

2. Cycle according to claim 1, in which the second end of the cable is shaped as a hook, and the plate comprises a slot into which the hook is able to be inserted.

3. Cycle according to claim 2, in which, in its unlocking position, the bolt is at a distance from the slot whereas, in its locking position, it is adjacent to the latter.

4. Cycle according to claim 1, in which the bolt can occupy its locking position only when the front wheel is forming a non-zero angle with the framework.

5. Cycle according to claim 1, which comprises a key-operated lock mounted on the frame of the cycle, this lock being able to assume, when the key is operated, a closed position in which the bolt is held in its locking position, and an open position allowing the passage of the bolt from its locking position to its unlocking position, and vice versa.

6. Cycle according to claim 1, in which the frame is provided with a support and in which the bolt is in the form of a pivoting lever, mounted such that it is hinged on the support in the vicinity of the fork.

7. Cycle according to claim 1, further comprising a luggage holder permanently fixed on the fork, the first end of the cable being permanently fixed to the luggage holder.

8. Cycle according to claim 1, further comprising an attached metal plate fixed to the fork and a luggage holder permanently fixed on the fork by means of the attached metal plate, the first end of the cable being permanently fixed to the attached metal plate.

9. Cycle according to claim 7, in which the luggage holder comprises a housing and in which the second end of the cable comprises a hook formed by a cylindrical shaft extended by a rod having a diameter less than a diameter of the shaft, the rod being extended by a disk having a diameter greater than the diameter of the rod, the hook being inserted in the housing of the luggage holder when the cable is not being used.

10. Cycle according to claim 9, in which the luggage holder is made from a lattice of vertical and horizontal steel wires, and including an additional bent wire defining with one of said vertical wires a housing, the housing having an upper part where a separation between the additional wire and the vertical wire is sufficient to allow the insertion and the withdrawal of the hook, and a lower part where a separation between the additional wire and the vertical wire is less than the diameter of the shaft and less than the diameter of the disk such that the hook, resting on a horizontal wire, is held there unless the hook is raised in order to place the hook in alignment with the upper part, which allows its withdrawal.

11. Cycle provided with a frame, a luggage holder comprising a housing, and an anti theft device comprising a cable having a first end permanently fixed to the luggage holder and a mobile second end capable of cooperating with a bolt mounted on the frame, the bolt being movable between a locking position in which the bolt locks the second end of the cable with respect to the frame, and an unlocking position in which the bolt releases the second end with respect to the frame, the cable comprising a hook formed by a cylindrical shaft extended by a rod having a diameter less than a diameter of the shaft, the rod extending to a disk having a diameter greater than the diameter of the rod, the hook being inserted in the housing of the luggage holder when the cable is not being used.

12. Cycle according to claim 11, in which the luggage holder is made from a lattice of vertical and horizontal steel wires, and an additional bent wire defining with one of said vertical wires a housing, the housing having an upper part where the separation between the additional wire and the vertical wire being sufficient to allow the insertion and the withdrawal of the hook, and a lower part where the separation between the additional wire and the vertical wire is less than the diameter of the shaft and than that of the disk, such that the hook, resting on a horizontal wire, is held in place, unless the hook is raised in order to place it in alignment with the upper part, which allows withdrawal of the hook.

13. Cycle according to claim 11, in which the frame of the cycle comprises a framework upon which a fork carrying a front wheel is mounted in a pivoting manner, the anti theft device further comprising a plate being mounted on the fork, the bolt locking the second end of the cable with respect to the plate.

14. A cycle provided with a frame, a luggage holder comprising a housing, and an anti theft device, the cycle provided with a frame having a pivoting fork carrying a front wheel, a plate provided with a slot mounted on the fork, a housing carried by the frame, a cable having a first end permanently mounted to the frame and a mobile second end, the second end capable of cooperating with a bolt mounted on the frame, the bolt movable between a locking position in which the bolt locks the second end of the cable in the slot of the plate such that the second end is fixed with respect to the frame, and an unlocking position in which the bolt permits release of the second end from the slot of the plate, the second end of the cable comprising a hook formed by a cylindrical shaft extended by a rod having a diameter less than a diameter of the shaft, the rod extending to a disk having a diameter greater than the diameter of the rod, the hook sized to be inserted in the slot of the plate prior to placing the bolt in the locking position, the hook further sized to be carried by the housing when the second end of the cable is not disposed in the slot of the plate.

15. Cycle according to claim 14, wherein the housing is carried by a luggage holder made from a lattice of vertical and horizontal steel wires, the luggage holder including an additional bent wire, the bent wire and one of the vertical wires defining at least a portion of the housing, the housing having a widened upper part sized to allow insertion of the hook into the housing and withdrawal of the hook from the housing, and a narrowed lower part measuring less than the diameter of the shaft and the diameter of the disk such that the hook rests on one of the horizontal wires.

16. An anti-theft device for a cycle having a frame and a fork pivotable relative to the frame, the anti-theft device comprising:

a cable having a first end arranged for permanent attachment to the frame;

the cable including a movable second end, the second end including a shaft, a narrowed rod, and a disk, the narrowed rod having a cross section smaller than a cross-section of both the shaft and the disk;

a plate arranged for mounting to the fork, the plate including a slot sized to receive the narrowed rod;

a shiftable bolt secured to the frame and shiftable between a first position in which the narrowed rod may be moved into and out of engagement with the slot of the plate, and a second position in which the narrowed rod is secured within the slot of the plate;

a lock assembly operatively coupled to the bolt to secure the bolt in the second position; and a housing arranged for mounting to the cycle and sized to receive the second end when the narrowed rod is disengaged from the slot.

17. The device of claim 16, wherein the housing is formed in a luggage holder, the luggage holder comprising a plurality of rigid wires, the housing comprising a narrowed part sized to engage the narrowed rod, and a widened part sized to allow insertion of the narrowed rod into the narrowed part.

18. The device of claim 16, wherein a portion of the bolt and the plate are arranged to be mounted on the frame and fork, respectively, such that a portion of the bolt is positioned to abut the plate when the bolt is in the second position, and wherein the portion of the bolt and the plate are sized to cooperate to secure the fork at a non-zero angle with respect to the frame when the bolt is in the second position.

* * * * *